US012743344B2

(12) United States Patent
Bhalotia

(10) Patent No.: US 12,743,344 B2

(45) Date of Patent: Sep. 22, 2026

(54) NOTIFICATION BASED EXPIRY OF CACHE ENTRIES

(71) Applicant: Rubrik, Inc., Palo Alto, CA (US)

(72) Inventor: Anubhaw Bhalotia, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 54 days.

(21) Appl. No.: 19/023,096

(22) Filed: Jan. 15, 2025

(65) Prior Publication Data

US 2026/0203170 A1 Jul. 16, 2026

(51) Int. Cl.

| | |
|---|---|
| ***G06F 11/1446*** | (2026.01) |
| ***G06F 12/0891*** | (2016.01) |
| ***H04L 67/55*** | (2022.01) |
| ***H04L 67/568*** | (2022.01) |

(52) U.S. Cl.

CPC ...... *G06F 11/1461* (2013.01); *G06F 11/1464* (2013.01); *G06F 12/0891* (2013.01); *H04L 67/55* (2022.05); *H04L 67/568* (2022.05)

(58) Field of Classification Search

None

See application file for complete search history.

(56) References Cited

U.S. PATENT DOCUMENTS

| | | | | |
|---|---|---|---|---|
| 11,398,943 | B1 * | 7/2022 | Baldawa | G06F 12/0813 |
| 2021/0021563 | A1 * | 1/2021 | Hegde | H04L 47/286 |
| 2021/0389883 | A1 * | 12/2021 | Derryberry | G06F 3/0619 |
| 2023/0393947 | A1 * | 12/2023 | Parekh | G06F 11/1461 |
| 2024/0031353 | A1 * | 1/2024 | Jhaveri | H04L 9/3268 |
| 2024/0086285 | A1 * | 3/2024 | Rajpal | G06F 11/1469 |
| 2024/0095230 | A1 * | 3/2024 | Tripathi | G06F 16/2365 |
| 2026/0017147 | A1 * | 1/2026 | Goyal | G06F 11/1451 |

* cited by examiner

*Primary Examiner* — Umar Cheema

(74) *Attorney, Agent, or Firm* — Holland & Hart LLP

(57) ABSTRACT

Methods, systems, and devices for data management are described. A data management system (DMS), configured to manage backup data stored across a set of storage nodes for one or more customers of the DMS, may obtain an indication that an activation value of a feature for a first customer of the one or more customers has changed. The feature may be associated with management of the backup data, and the activation value may indicate if the feature is enabled for the first customer. The DMS may output, to a message queue accessible to the set of storage nodes and based on the indication that the activation value for the feature for the first customer has changed, a notification for one or more storage nodes to invalidate a cache entry associated with the feature for the first customer.

20 Claims, 10 Drawing Sheets

300

500

600

Figure 8:
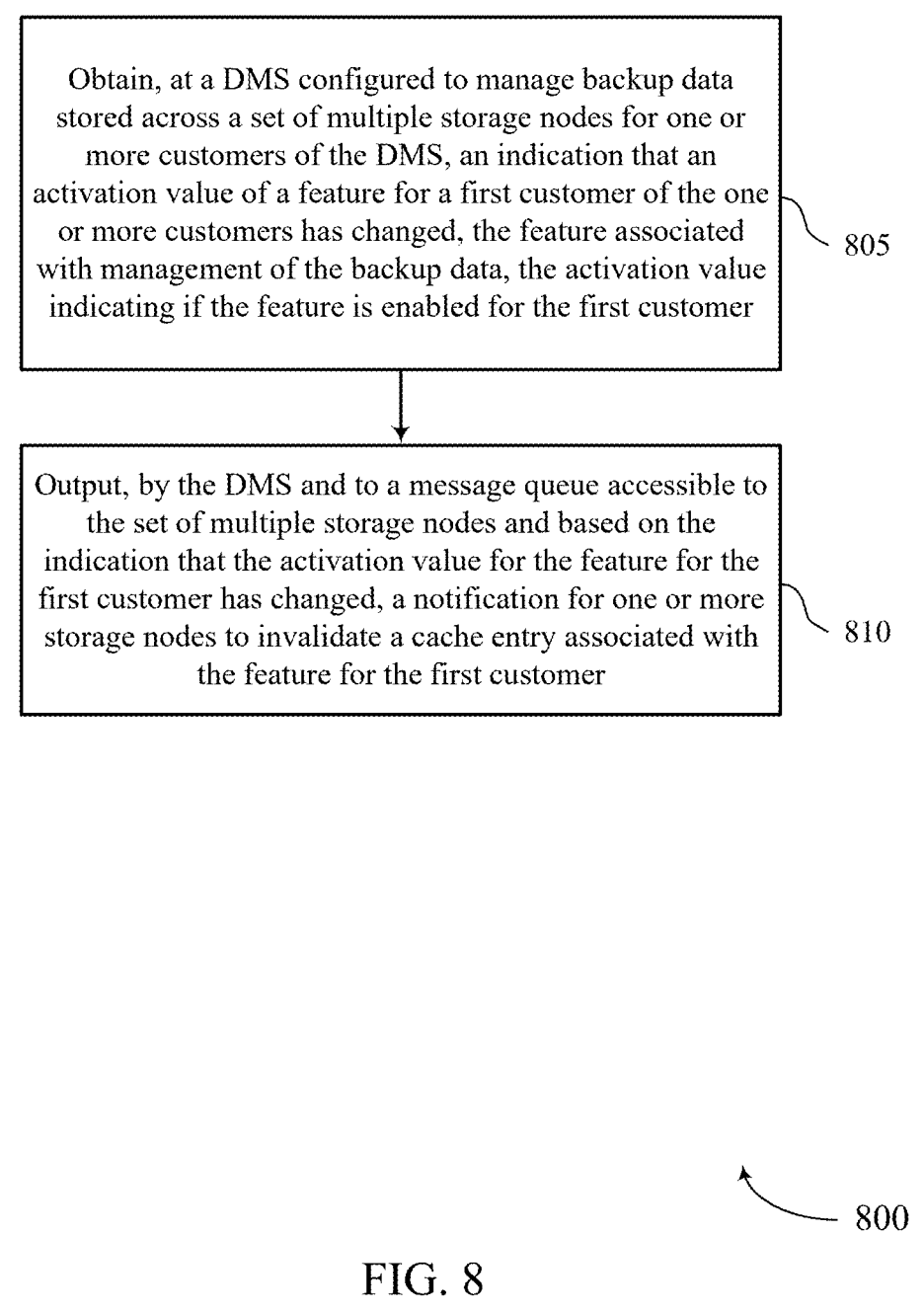

Obtain, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer

805

Output, by the DMS and to a message queue accessible to the set of multiple storage nodes and based on the indication that the activation value for the feature for the first customer has changed, a notification for one or more storage nodes to invalidate a cache entry associated with the feature for the first customer

Figure 9:
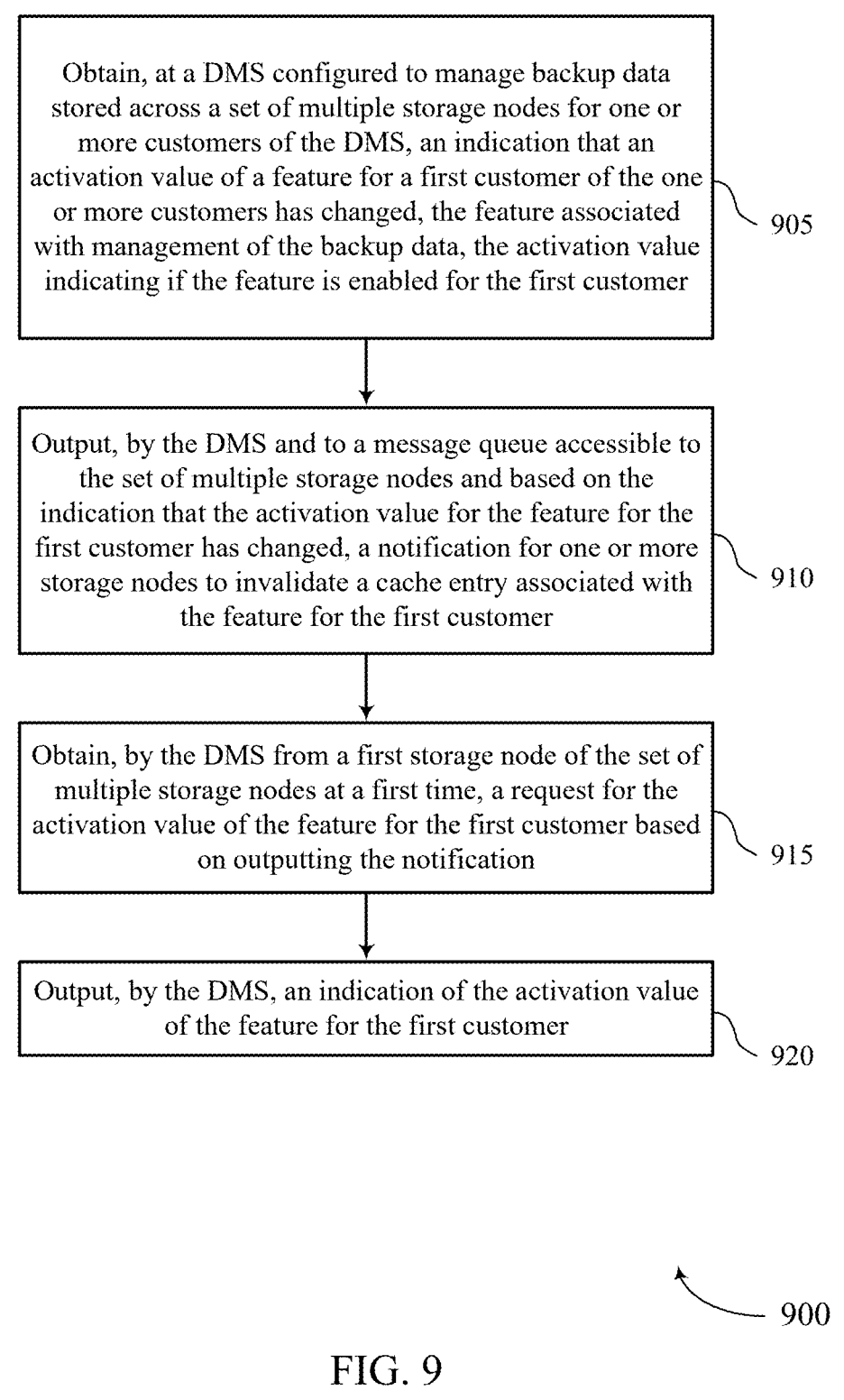

Obtain, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer

905

Output, by the DMS and to a message queue accessible to the set of multiple storage nodes and based on the indication that the activation value for the feature for the first customer has changed, a notification for one or more storage nodes to invalidate a cache entry associated with the feature for the first customer

910

Obtain, by the DMS from a first storage node of the set of multiple storage nodes at a first time, a request for the activation value of the feature for the first customer based on outputting the notification

915

Output, by the DMS, an indication of the activation value of the feature for the first customer

NOTIFICATION BASED EXPIRY OF CACHE ENTRIES

FIELD OF TECHNOLOGY

The present disclosure relates generally to data management, including techniques for notification based expiry of cache entries.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 through 10 show flowcharts illustrating methods that support notification based expiry of cache entries in accordance with aspects of the present disclosure.

DETAILED DESCRIPTION

Figure 1:
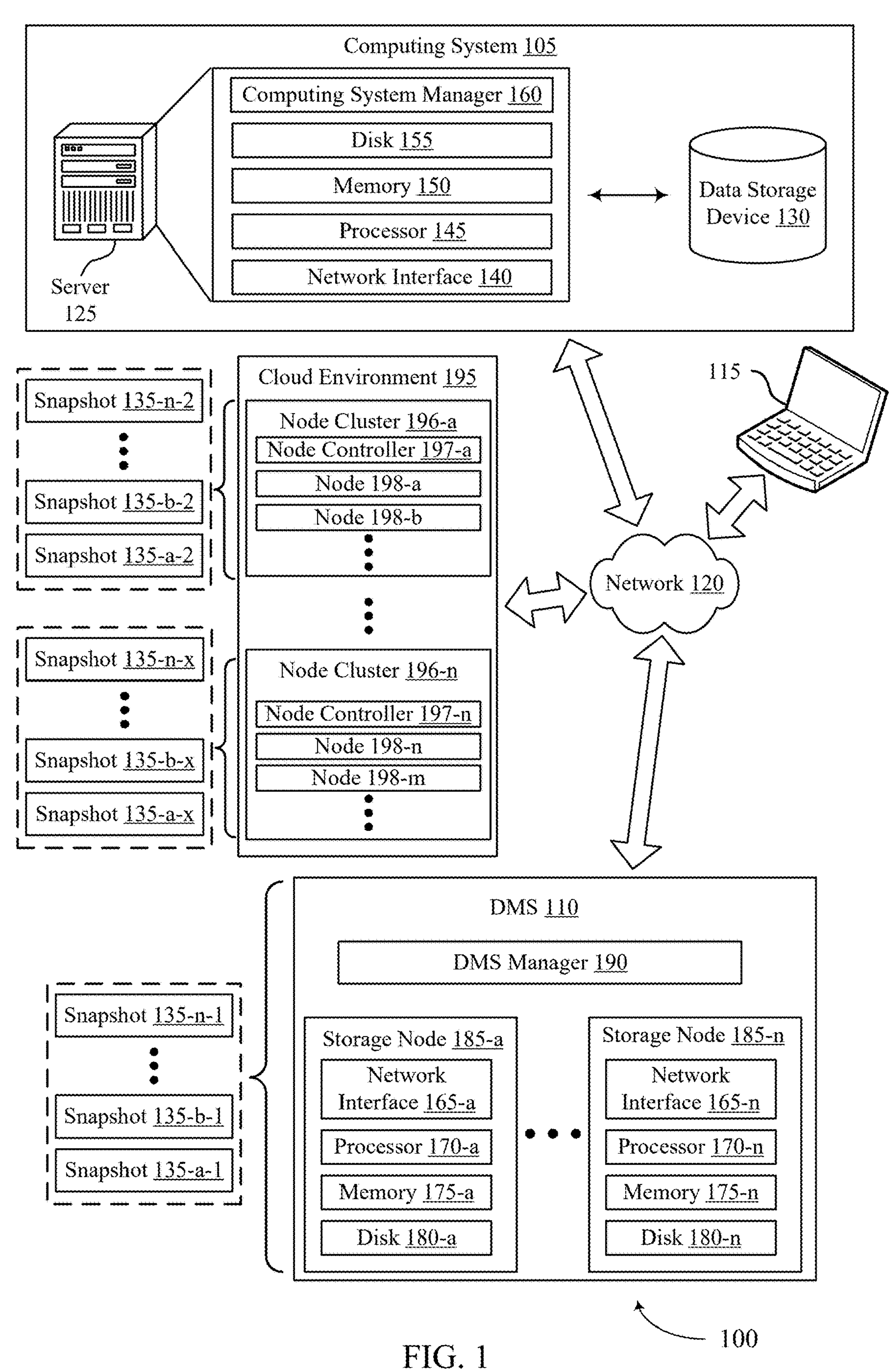
FIG. 1 illustrates an example of a computing environment that supports notification based expiry of cache entries in accordance with aspects of the present disclosure.

A data management system (DMS) may communicate with multiple storage nodes (e.g., servers) to provide backup and recovery services to multiple customers of the DMS. The DMS may store multiple feature flags indicating if a software feature is enabled for a customer of the DMS. A feature flag may include a user identifier (ID), a feature ID, and an activation value (e.g., a Boolean value indicating if the feature is enabled for the user). Execution of a code path at a storage node for a particular customer of the DMS (e.g., as part of a backup or restore operation for that particular customer) may include multiple lookups of an activation value of a feature flag for the particular customer. To reduce execution time of the code path, the storage node may cache the activation value of the feature flag at the storage node for the particular customer. For example, the storage node may store the activation value of the feature flag for the particular customer in a local memory cache of the storage node. In some examples, if the activation value of a feature flag for a particular customer is not already cached at a storage node before runtime of a code path at the storage node that demands the activation value, the storage node may request the activation value of the feature flag from the DMS. The DMS may provide the requested activation value for the feature flag to the storage node, and the storage node may cache the activation value for the feature flag for a time to live (TTL) duration (e.g., a set duration). Accordingly, storage of the activation value for a feature flag may reduce the quantity of requests to the DMS from the storage node for the activation value of the feature flag, which may reduce latency and network traffic associated with data management operations. After an expiration of the TTL duration, the storage node may remove the activation value from the cache. TTL durations may be implemented to manage cache size and keep the most recently used data in the memory cache.

However, storing an activation value of a feature flag for a TTL duration may create inconsistencies in the caches. For example, if the activation value for a feature flag changes after a storage node caches the activation value but before the expiration of the TTL duration, the storage node may use an inaccurate value for the activation value when executing a code path. For example, an administrative user of the DMS may update the activation value for a particular feature flag for a particular customer based on updated preferences of the customer or agreements with the customer or based on updates at the DMS (e.g., software or system updates at the DMS). Further, customer data managed by a DMS may be stored across multiple storage nodes. Accordingly, multiple storage nodes may perform data management operations (e.g., backup or restore operations) for a customer which may involve calls to the DMS from the multiple storage nodes for the same feature flag for the same customer. Different storage nodes may request activation values of feature flags from the DMS at different times, and/or different storage nodes may receive the activation values of feature flags from the DMS at different times. Accordingly, the different storage nodes may cache the activation values for the same feature flag for the same customer at different times, which may lead to inconsistencies between activation values for the same feature flag for the same customer cached at the different storage nodes.

According to techniques described herein, the DMS may utilize an event-driven invalidation system for cache entries at storage nodes associated with the DMS. The DMS may output a notification to a message queue indicating an invalidation of a feature flag for a particular customer. For example, if the DMS updates an activation value of a feature flag, the DMS may output a notification to a message queue indicating that any cached activation value for the feature flag associated with the particular customer is invalidated. For example, notifications in the message queue may be identified by feature ID and customer ID. The one or more storage nodes may subscribe to topics of the message queue, where a topic may be associated with a particular feature flag ID and/or customer ID. For example, a storage node may subscribe to a particular topic once the storage node caches an activation value for the feature flag ID and/or customer ID associated with the particular topic. Accordingly, the one or more storage nodes (e.g., subscribers to the topic of the message queue) may receive the notification. The one or more storage nodes may remove or delete the activation value of the feature flag or the feature flag from a respective cache.

If a storage node requests the activation value of a feature flag after the notification from the DMS, the DMS may provide to the storage node the updated activation value of the feature flag. The storage node may cache the updated activation value for the feature flag until the storage node receives a second notification indicating the updated activation value of the feature flag is invalid (or until a TTL duration for the cached value expires). The event-driven invalidation system for cache entries synchronizes multiple caches across multiple storage nodes by causing the storage nodes to remove cache entries once an activation value associated with the cache entries becomes invalid (e.g., is updated at the DMS).

FIG. 1 illustrates an example of a computing environment 100 that supports notification based expiry of cache entries in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

According to techniques described herein, the DMS 110 may utilize an event-driven invalidation system for cache entries at storage nodes 185 of the DMS 110 or nodes 198 at a cloud environment 195. The DMS 110 may output a notification to a message queue indicating an invalidation of a feature flag for a particular customer. For example, if the DMS 110 updates an activation value of a feature flag for a particular customer, the DMS 110 may output a notification to a message queue indicating that any cached activation value for the feature flag associated with the particular customer is invalidated. In some examples, the message queue may be hosted at the DMS 110 or at a cloud environment 195. Notifications in the message queue may be identified by feature ID and/or customer ID (e.g., user ID associated with the particular customer of the DMS 110). One or more storage nodes 185 or nodes 198 (e.g., subscribers to the topic of the message queue) may receive the notification. The one or more storage nodes 185 or nodes 198 may remove or delete the activation value of the feature flag for a particular customer from a respective cache based upon the notification in the message queue for the topic corresponding to the particular feature flag and customer.

If a storage node 185 requests the activation value of a feature flag after the notification, the DMS 110 may provide the updated activation value of the feature flag to the storage node 185. The storage node 185 may cache the updated activation value for the feature flag until the storage node 185 receives a second notification indicating the updated activation value of the feature flag is invalid (or, in some examples, until a TTL duration for the cached value expires). The event-driven invalidation system for cache entries may accordingly synchronize caches across multiple storage nodes 185 by causing the multiple storage nodes 185 or nodes 198 to remove or delete cache entries once an activation value associated with the cache entries becomes invalid (e.g., is updated at the DMS 110).

Figure 2:
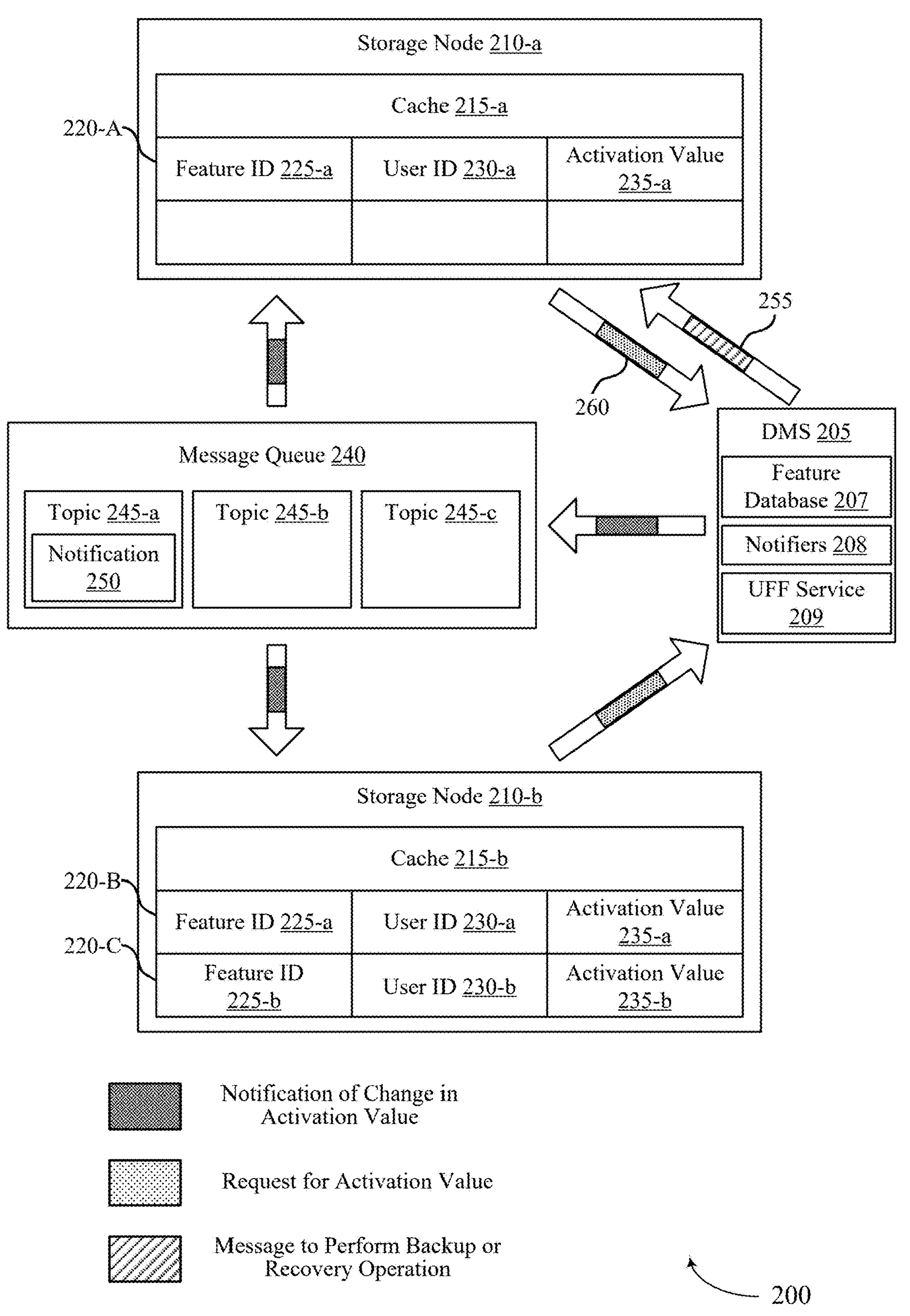
FIG. 2 shows an example of a system diagram that supports notification based expiry of cache entries in accordance with aspects of the present disclosure.

FIG. 2 shows an example of a system diagram 200 that supports notification based expiry of cache entries in accordance with aspects of the present disclosure. The system diagram 200 may implement or be implemented by aspects of the computing environment 100 described with reference to FIG. 1. For example, the system diagram 200 may include a DMS 205, which may be an example of a DMS 110 as described with reference to FIG. 1. The DMS 205 may store multiple feature flags and corresponding activation values 235 in a feature database 207. The DMS may include one or more notifiers 208 identifying one or more changes in one or more corresponding activation value 235. For example, the one or more notifiers 208 may notify a unified feature flag (UFF) service 209 of the DMS 205. The DMS 205 may include or communicate with multiple storage nodes 210 (e.g., a first storage node 210-*a* and a second storage node 210-*b*). The storage nodes 210 may be examples of storage nodes 185 or nodes 198 as described with reference to FIG. 1. Although shown as one or two storage nodes 210, DMS 205 may include or communicate with any quantity of storage nodes 210 (e.g., dozens, hundreds, thousands, or millions of storage nodes 210). A storage node 210 may include a cache 215 (e.g., the first storage node 210-*a* may include a first cache 215-*a*, and the second storage node 210-*b* may include a second cache 215-*b*). The cache 215 may include one or more cache entries 220 (e.g., the first cache 215-*a* may include a first cache entry 220-*a*, and the second cache 215-*b* may include a second cache entry 220-*b* and a third cache entry 220-*c*). The cache entries 220 may include a respective feature ID 225, a user ID 230, and a first activation value 235 (e.g., the first cache entry 220-*a* and the second cache entry 220-*b* may include a first feature ID 225-*a*, a first user ID 230-*a*, and a first activation value 235-*a*, and the third cache entry 220-*c* may include a second feature ID 225-*b*, a second user ID 230-*b*, and a second activation value 235-*b*). Although shown as one or two cache entries 220, a cache 215 may include any quantity of cache entries 220 (e.g., hundreds, thousands, or millions of cache entries 220).

The DMS 205 may communicate with multiple storage nodes 210 (e.g., servers) to provide backup and recovery services to multiple customers of the DMS 205. The DMS 205 may store multiple feature flags indicating if a software feature is enabled for a customer of the DMS 205. For example, the DMS 205 may include a feature database 207 storing multiple feature flags and multiple corresponding activation values 235. The software feature may be an upgrade procedure, a backup procedure, or an extending storage device procedure. A feature flag may include a feature ID 225 and a user ID 230. The feature flag may be associated with an activation value 235 (e.g., a Boolean value indicating if the feature is enabled for the user). Execution of a code path at a storage node 210 for a particular customer (e.g., as part of a backup or restore operation or any other data management operation such as copying data, reading data, updating data, or moving data) may include multiple lookups of an activation value 235 of a feature flag for the particular customer. To reduce execution time of the code path, the storage nodes 210 may store the activation value 235 of the feature flag in the cache 215 (e.g., for the particular customer). For example, the storage nodes 210 may store the feature flag and activation value 235 in a cache entry 220. For example, the cache entry 220 may include the feature ID 225, the user ID 230, and the activation value 235 of the feature flag. A total quantity of feature flags stored at the feature database 207 of the DMS 205 may be equivalent to a product of the quantity of users and the quantity of features. Caches 215 may have limited memory sizes, and accordingly, a cache 215 may be unable to store all the feature flags.

If an activation value 235 of a feature flag for a particular customer is not cached before runtime of a code path that demands the activation value 235, a storage node 210 may request the activation value 235 of the feature flag from the DMS 205 (e.g., as described with reference to FIG. 3). The DMS 205 may provide the requested activation value 235 for the feature flag to the storage node 210, and the storage node 210 may store the activation value 235 in a cache entry 220 for a TTL duration (e.g., a set duration). After an expiration of the TTL duration, the storage node 210 may remove the cache entry 220 for the feature flag from the cache 215. TTLs may be implemented due to the limited memory size of a cache and to store the activation values for the most recently used features, which are more likely to be used again than less recently used features. However, storing an activation value 235 of a feature flag or for a TTL duration may create inconsistencies in multiple caches 215 across multiple storage nodes 210. For example, if the activation value 235 for a feature flag changes after a storage node 210 caches the activation value 235 but before the expiration of the TTL duration, the storage node 210 may use an inaccurate value for the activation value 235 when executing a code path. Further, different storage nodes 210 may cache the activation values 235 at different times, which may lead to inconsistencies between activation values 235 for the same feature flag cached at the different storage nodes 210. For example, the different storage nodes 210 may request activation values from the DMS 205 at different times as the different storage nodes 210 may perform different operations depending on the data stored at the storage nodes 210 or may perform operations at different times or in different orders depending the workload of the different storage nodes 210.

A cache management system may rely on a TTL mechanisms to clear cache entries 220 periodically. While the TTL mechanisms may ensure that outdated cache entries 220 are eventually removed (e.g., as all cache entries are eventually removed once the corresponding TTL expires), the TTL mechanisms may lead to some inefficiencies or inconsistencies. For example, a cache 215 may clear valid cache entries 220 which may be likely to be reused. Clearing valid cache entries 220 may increase cache misses and requests for activation values to the DMS 205 (e.g., which may be referred to as data reloads at the storage nodes 210), which may degrade performance and increase latency. For example, in a DMS 205 where data changes may be event-driven in addition to or instead of time-dependent, TTL mechanisms alone may be suboptimal for cache management.

According to techniques described herein, a cache management system (e.g., including the DMS 205 and the storage nodes 210) may manage cache expiry based on event-driven notifications (e.g., in addition to or instead of time-based expiration). For example, each storage node 210 may include a respective cache 215 (e.g., the cache 215 may reside on the client side), and the DMS 205 may utilize a message queue 240 to transmit invalidation notifications from a service where events are generated. For example, a UFF service 209 of the DMS 205 may identify changes in the feature database 207 (e.g., based on one or more notifiers 208), and the DMS 205 may output an indication of one or more changed feature flags to the message queue 240. The notification-based cache expiry mechanism may reduce inefficiencies associated with TTL-based caches. One or more cache entries 220 across the multiple caches 215 may be invalidated based on an event triggering a data change (e.g., a change in an activation value 235 of a feature flag). For example, the DMS 205 may output a notification indicating a change in the first activation value 235-*a* for a feature flag associated with the first feature ID 225-*a* and the first user ID 230-*a*. The first storage node 210-*a* may obtain the notification and invalidate or delete the first cache entry 220-*a*, and the second storage node 210-*b* may obtain the notification and invalidate or delete the second cache entry 220-*b*.

The DMS 205 and the storage nodes 210 may utilize the message queue 240 to facilitate communication between the DMS 205 (e.g., a service generating events) and the storage nodes 210 (e.g., the clients). When a relevant event occurs, the DMS 205 may send a notification through the message queue 240 prompting the one or more storage nodes 210 to invalidate a cache entry 220 storing an indicated feature flag. The notification-based cache expiry may ensure that the cache 215 may be updated when an activation value 235 for a feature flag in a cache entry 220 changes (e.g., when a cache entry 220 includes an outdated activation value 235). The notification-based cache expiry may reduce cache misses and improve overall system performance.

The DMS 205 may communicate with the multiple storage nodes 210 via message queue-based communication. The DMS 205 and the multiple storage nodes 210 may use a message queue 240 as the intermediary for cache invalidation notifications. The message queue 240 may provide a reliable and asynchronous communication channel between the DMS 205 (e.g., a service where data changes occur) and the multiple storage nodes 210 (e.g., client-side cache). The message queue 240 may ensure that notifications are delivered in a timely and ordered manner, regardless of network conditions or client availability. The message queue may be hosted at the DMS 205 or at a cloud environment 195 as described herein.

The DMS 205 may be a producer of the message queue 240, and the multiple storage nodes 210 may be subscribers of the message queue 240. The message queue 240 may include one or more topics 245 (e.g., a first topic 245-*a*, a second topic 245-*b*, and a third topic 245-*c*). In some examples, each topic 245 may correspond to a feature or feature ID (e.g., the first topic 245-*a* may correspond to the first feature ID 225-*a*, the second topic 245-*b* may correspond to the second feature ID 225-*b*, and the third topic 245-*c* may correspond to a third feature ID 225). If a topic 245 does not exist for a feature or feature ID 225 when a storage node 210 request the activation value 235 of a feature flag, the DMS 205 (e.g., a UFF service 209 of the DMS 205) may create a topic 245 for the requested feature flag. A storage node 210 may subscribe to (e.g., listen to or obtain a notification from) one or more topics 245 based on one or more feature flags cached at the storage node 210.

For example, the first storage node 210-*a* may subscribe to a first topic 245-*a* (e.g., based on the first cache 215-*a* including the first cache entry 220-*a* associated with the first feature ID 225-*a*), and the second storage node 210-*b* may subscribe to the first topic 245-*a* and the second topic 245-*b*. The DMS 205 may output a notification indicating a change in a feature flag associated with the first feature ID 225-*a* and the first user ID 230-*a*. In some examples, the DMS 205 may output a notification including the first user ID 230-*a* or a flag name (e.g., a flag name associated with the first feature ID 225-*a* or a flag name associated with the feature flag) to the first topic 245-*a* associated with the first feature ID 225-*a* of the message queue 240. The first storage node 210-*a* may obtain the notification based on monitoring the first topic 245-*a*, and the first storage node 210-*a* may invalidate the first cache entry 220-*a* based on the notification being output to the first topic 245-*a* and the notification including the first user ID 230-*a* or the flag name. Similarly, the second storage node 210-*b* may obtain the notification and invalidate the second cache entry 220-*b*.

A notification output by the DMS 205 may include a message ID. The DMS 205 may output multiple notifications for the same feature flag (e.g., including the same message ID). To reduce processing at the storage nodes 210, the storage nodes 210 may maintain an in-memory cache of recently processed message IDs (e.g., message IDs processed within a duration). The storage nodes 210 may check a notification in the message queue 240 and skip the notification if the notification includes a message ID that has already been processed (e.g., a message ID stored in the in-memory cache). In some examples, the storage nodes 210 may check a notification in a topic 245 of the message queue 240 and skip the notification if the notification includes a message ID that has already been processes for the topic 245

The cache management system may include event-driven cache invalidation methods based on a message queue 240 to synchronize data changes between the DMS 205 (e.g., a service) and a respective cache 215 of the multiple storage nodes 210 (e.g., a client-side cache). For example, event-driven invalidation may leverage event-driven notifications (e.g., unlike existing TTL-based invalidation, which may rely on time-based triggers to invalidate cache entries 220). The cache entries 220 may be invalidated when a specific event occurs in the DMS 205, which may ensure that the multiple caches 215 remains accurate and consistent with the current state of an activation value 235 for a feature flag (e.g., data). Event-driven invalidation may eliminate or reduce the inefficiencies of cache invalidations and the subsequent cache misses associated with TTL-based invalidation and/or use of incorrect activation values associated with TTL-based invalidation.

The DMS 205 may output a notification to the message queue 240 to invalidate one or more cache entries 220 based on one or more notifiers 208 of the DMS 205. The one or more notifiers 208 may detect a change in one or more activation values 235. The one or more notifiers 208 may be software or a service of the DMS 205 operable to identify a change to an activation value 235 of a feature flag in the feature database 207. In some examples, the one or more notifiers 208 may notify the UFF service 209 when there is a change in a feature flag configuration (e.g., when an activation value 235 of a feature flag changes). In some examples, the one or more notifiers 208 (e.g., attribute change notifiers) may notify the UFF service 209 when there is a change in value of attributes for a user account or cluster (e.g., when an activation value 235 of a feature flag changes). In some cases, the storage nodes 210 may perform client side cache invalidation after the UFF service restarts.

The one or more notifiers 208 may monitor changes to feature flag rules (e.g., enabling or disabling feature flags, changes in percentage rollouts, and rule modifications). The one or more notifiers 208 enable the DMS 205 to trigger a cache invalidation based on a change in the feature flag configuration (e.g., based on a change in an activation value 235 of a feature flag). For example, the one or more notifiers 208 may output a notification to a corresponding topic 245 (e.g., a topic 245 associated with the feature flag that was changed) in the message queue 240. The notification may include the feature ID 225.

The one or more notifiers 208 (e.g., attribute change notifiers) may detect a change in a supported attribute, and the DMS 205 may trigger a cache invalidation based on the detected change in the supported attribute. In some examples, the one or more notifiers 208 may monitor changes to a customer data management version ID. The DMS 205 may output a notification (e.g., including a cluster ID or user ID 230 associated with the customer) to one or more topics 245 based on a change to the customer data management version ID. For example, a change in a customer data management version may enable or disable one or more features. The change in the customer data management version may change one or more activation values 235 cached in the one or more topics 245. Additionally, or alternatively, the notification may include the user ID 230 or a flag name.

The multiple storage nodes 210 may provide client-side cache management. A client-side cache may be responsive to external events (e.g., events at the DMS 205) rather than or in addition to internal timers. This client-side cache may enable a more efficient and flexible cache management system that adapts to real-time changes. For example, client side cache management may reduce data inconsistencies between the multiple cache 215 and the DMS 205. Additionally, or alternatively, client-side cache management may improve an overall performance of the client application (e.g., by reducing look-up times for activation values 235).

In an illustrative example, a notifier 208 of the DMS 205 may detect a change in an attribute in a customer database. The change in the attribute may update one or more activation values associated with one or more feature flags. For example, the first activation value 235-*a* of a first feature flag associated with the first feature ID 225-*a* and the first user ID 230-*a* may be changed from a first value (e.g., false) to a second value (e.g., true). The updated activation values 235-*a* may enable the feature associated with the first feature ID 225-*a* for the customer database. The DMS 205 may output a notification for the first feature flag to the message queue 240. For example, the DMS 205 may output a notification 250 including an indication of the first feature flag (e.g., the first user ID 230-*a* and/or a first flag name) to the first topic 245-*a* (e.g., the first topic corresponding to the first feature ID 225-*a*). The first storage node 210-*a* may subscribe to (e.g., monitor) the first topic 245-*a* based on the first cache 215-*a* including a first cache entry 220-*a* associated with the first feature ID 225-*a*. The first storage node 210-*a* may obtain the notification 250 from the message queue 240, and the first storage node 210-*a* may invalidate or delete the first cache entry 220-*a* based on receiving the notification 250.

The DMS 205 may output a message 255 to the first storage node 210-*a* to perform a backup or recovery operation for the customer database. As part of the backup or recovery operation, the first storage node 210-*a* may perform a feature flag lookup for the second feature flag. The first storage node 210-*a* may output a request 260 to the DMS 205 for the second activation value 235-*b*. The DMS 205 may output the second activation value 235-*b* to the first storage node 210-*a*. The first storage node 210-*a* may perform the backup operation based on the second activation value 235-*b* (e.g., by enabling or disabling a feature associated with the second feature ID 225-*b* during the backup or recovery operation).

The cache management system may utilize a decoupled architecture. By decoupling the cache invalidation logic from the client application (e.g., the storage nodes 210) and relying on an external service (e.g., the message queue 240), the cache management system may promote modularity and scalability. A design of the cache management system may enable the cache invalidation logic to be integrated into various systems and adapted to different types of events and data models. The cache invalidation logic may be a versatile solution across multiple domains. The cache management system may manage cache expiry in distributed systems and offer a targeted and event-responsive solution.

In some examples, the storage nodes 210 may utilize time-based triggers and event based triggers to invalidate cache entries 220. The TTL for cache entries 220 may be relatively large (e.g., 24 hours) to prevent invalidation of valid cache entries 220.

Figure 3:
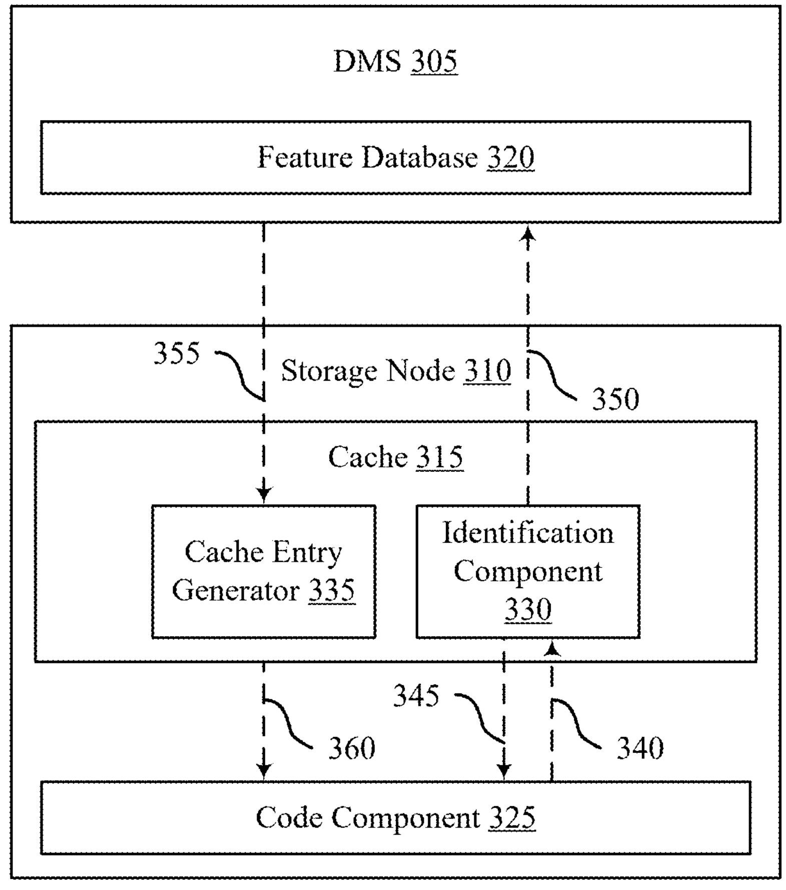
FIG. 3 shows an example of a system diagram that supports notification based expiry of cache entries in accordance with aspects of the present disclosure.

FIG. 3 shows an example of a system diagram 300 that supports notification based expiry of cache entries in accordance with aspects of the present disclosure. The system diagram 300 may implement or be implemented by aspects of the computing environment 100 described with reference to FIG. 1 or the system diagram 200 described with reference to FIG. 2. For example, the DMS 305 may be a DMS 110 or a DMS 205 as described herein with reference to FIGS. 1 and 2. The DMS 305 may include a feature database 320 including one or more feature flags (e.g., feature ID 225 and user ID 230 as described with reference to FIG. 2) and one or more associated activation values (e.g., activation values 235 as described with reference to FIG. 2). The storage node 310 may be a storage node 185, a cloud environment 195, or a storage node 210 as described with reference to FIGS. 1 and 2. The storage node 310 may include a cache 315 (e.g., a cache 215 described with reference to FIG. 2) and a code component 325. For example, the code component 325 may execute a code path (e.g., may execute code) to perform a data management operation such as a backup or a recovery operation. The cache 315 may include one or more cache entries (e.g., cache entries 220 described with reference to FIG. 2), a cache entry generator 335, and an identification component 330.

Execution of a code path at a storage node 210 by the code component 325 for a particular customer (e.g., as part of a backup or restore operation) may include multiple lookups of an activation value of a feature flag. For example, the code component 325 may output an indication 340 (e.g., a flag evaluation command for a feature ID and a user ID) to the cache 315. The identification component 330 of the cache 315 may identify if the cache 315 includes a cache entry storing an activation value for the feature flag (e.g., a cache entry including the feature ID and user ID). If the cache 315 includes a cache entry storing the activation value for the feature flag, the cache 315 may output an indication 345 of the activation value (e.g., the flag value).

If the cache 315 does not include a cache entry storing the activation value, the storage node 210 may output, to the DMS 305, a request 350 for the activation value of the feature flag. The DMS 305 may identify the activation value for the feature flag (e.g., the activation value associated with the feature ID and the user ID), and the DMS 305 may output an indication 355 of the activation value to the storage node 310. The cache entry generator 335 may generate a cache entry based on the feature flag and the indication 355 (e.g., a cache entry including the feature ID, the user ID, and the activation value). The cache 315 may output an indication 360 of the activation value (e.g., flag value) to the code component 325. The code component 325 may enable or disable a feature of a backup or recovery operation based on the activation value.

According to techniques described herein, the DMS 305 may utilize an event-driven invalidation system for cache entries at storage nodes 310 of the DMS 305. The DMS 305 may output a notification to a message queue indicating an invalidation of a feature flag for a particular customer. For example, if the DMS 305 updates an activation value of a feature flag, the DMS 305 may output a notification to a message queue indicating that any cached activation value for the feature flag associated with the particular customer is invalidated. For example, notifications in the message queue may be identified by feature ID and customer ID. One or more storage nodes 310 (e.g., subscribers to the topic of the message queue) may receive the notification. The one or more storage nodes 310 may remove or delete the activation value of the feature flag or the feature flag from a respective cache based on receiving the notification.

Figure 4:
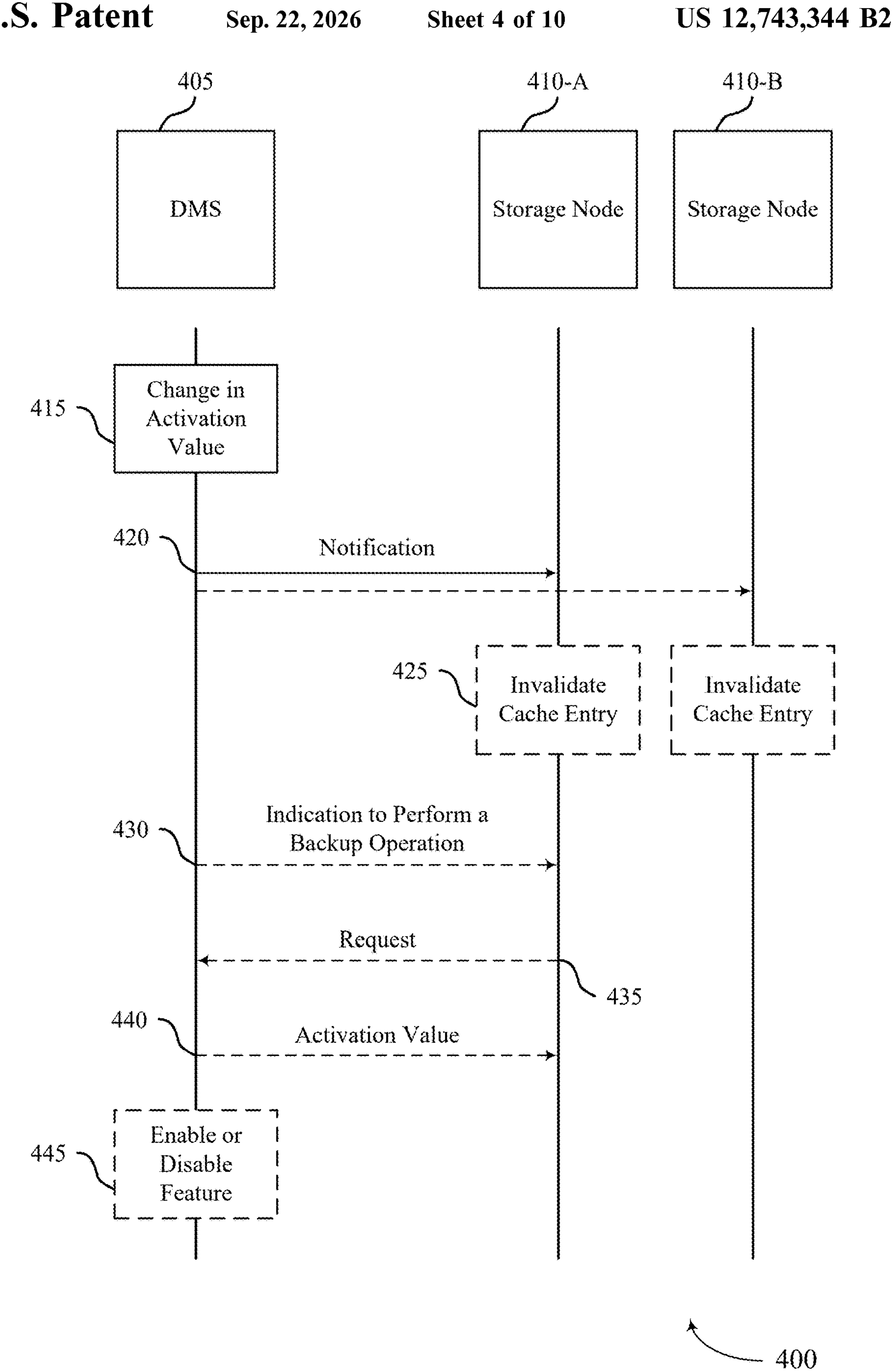
FIG. 4 shows an example of a process flow that supports notification based expiry of cache entries in accordance with aspects of the present disclosure.

FIG. 4 shows an example of a process flow 400 that supports notification based expiry of cache entries in accordance with aspects of the present disclosure. The process flow 400 may implement or be implemented by aspects of FIGS. 1-3. For example, the process flow 400 may include a DMS 405, which may be an example of a DMS 110, a DMS 205, or a DMS 305 as described herein. As another example, the process flow 400 may include a first storage node 410-*a* and a second storage node 410-*b*, which may be examples of storage nodes 185, nodes 198, storage nodes 210, or storage nodes 310 as described herein. as described herein. In the following description of the process flow 400, operations between the DMS 405, the first storage node 410-*a*, and the second storage node 410-*b* may be added, omitted, or performed in a different order (with respect to the exemplary order shown).

At 415, the DMS 405 (e.g., a DMS 405 configured to manage backup data stored across a set of storage nodes 410 for one or more customers of the DMS 405) may obtain an indication that an activation value of a feature for a first customer of the one or more customers has changed. The feature may be associated with management of the backup data, and the activation value may indicate if the feature is enabled for the first customer. In some cases, the DMS 405 may update the activation value of the feature.

In some examples, obtaining the indication that the activation value has changed may be based on updating the activation value. In some cases, the DMS 405 may receive, via a user interface associated with an administrative user, the indication that the activation value has changed. For example, an administrative user of the DMS 405 may update the activation value for a particular feature flag for a particular customer (e.g., user) based on updated preferences of the customer or agreements with the customer or based on updates at the DMS (e.g., software or system updates at the DMS).

At 420, the DMS 405 may output, to a message queue accessible to the set of storage nodes 410 and based on the indication that the activation value for the feature for the first customer has changed, a notification for one or more storage nodes 410 (e.g., the first storage node 410-*a* or the second storage node 410-*b*) to invalidate a cache entry associated with the feature for the first customer (e.g., invalidate or delete the cache entry 220 as described with reference to FIG. 2). In some cases, the DMS 405 may output the notification to a topic of the message queue. The topic may be associated with the feature for the first customer. The message queue may include a set of topics associated with a set of respective features. The set of topics may include the topic. In some cases, the DMS 405 may output the notification to a subset of storage nodes 410 (e.g., the first storage node 410-*a*) of the set of storage nodes 410 based on the subset of storage nodes 410 being subscribed to the topic of the message queue. The cache entry associated with the feature for the first customer may include a feature ID associated with the feature, a customer ID (e.g., user ID) associated with the first customer, and the activation value.

In some cases, the DMS 405 may obtain a second indication that a second activation value of a second feature for a second customer of the one or more customers has changed. The second feature may be associated with the management of the backup data. The second activation value may indicate if the second feature is enabled for the second customer. The DMS 405 may output, to a second topic of the message queue and based on the indication that the activation value for the feature for the second customer has changed, a second notification for one or more second storage nodes 410 (e.g., the first storage node 410-*a* or the second storage node 410-*b*) to invalidate a second cache entry associated with the second feature for the second customer. The second topic may be associated with the second feature for the second customer.

In some cases, the DMS 405 may obtain a second indication that a second activation value of a second feature for the first customer of the one or more customers has changed. The second feature may be associated with the management of the backup data. The second activation value may indicate if the second feature is enabled for the first customer. The DMS 405 may output, to a second topic of the message queue and based on the indication that the activation value for the feature for the first customer has changed, a second notification for one or more second storage nodes (e.g., the first storage node 410-*a* or the second storage node

410-*b*) to invalidate a second cache entry associated with the second feature for the first customer. The second topic may be associated with the second feature for the first customer.

In some cases, the notification may be configured to cause the one or more storage nodes 410 of the set of storage nodes 410 to remove the cache entry from respective caches of the one or more storage nodes 410. For example, at 425, the one or more storage nodes 410 may invalidate the cache entry associated with the feature for the first customer based on the notification.

At 430, the DMS 405 may output a message that schedules the first storage node 410-*a* to perform a backup operation for the first customer or a restore operation for the first customer.

At 435, the DMS 405 may obtain, from the first storage node 410-*a* of the set of storage nodes 410 at a first time, a request for the activation value of the feature for the first customer based on outputting the notification. In some cases, obtaining the request may be based on the message that schedules the first storage node 410-*a* to perform a backup operation or a restore operation. In some cases, the DMS 405 may obtain, from the first storage node 410-*a* of the set of storage nodes 410 and prior to obtaining the indication that the activation value of the feature has changed, a request for the activation value of the feature for the first customer. The activation value may be associated with a TTL duration, and the notification may be output prior to an expiration of the TTL duration.

At 440, the DMS 405 may output an indication of the activation value of the feature for the first customer.

In some cases, the DMS 405 may obtain, from the second storage node 410-*b* of the set of storage nodes 410 at a second time, a second request for the activation value of the feature for the first customer based on outputting the notification. The second time may be after the first time. The DMS 405 may output a second indication of the activation value of the feature for the first customer.

At 445, the DMS 405 may enable or disable the feature for the first customer based on the activation value. The management of the backup data may be based on enabling or disabling of the feature for the first customer.

Figure 5:
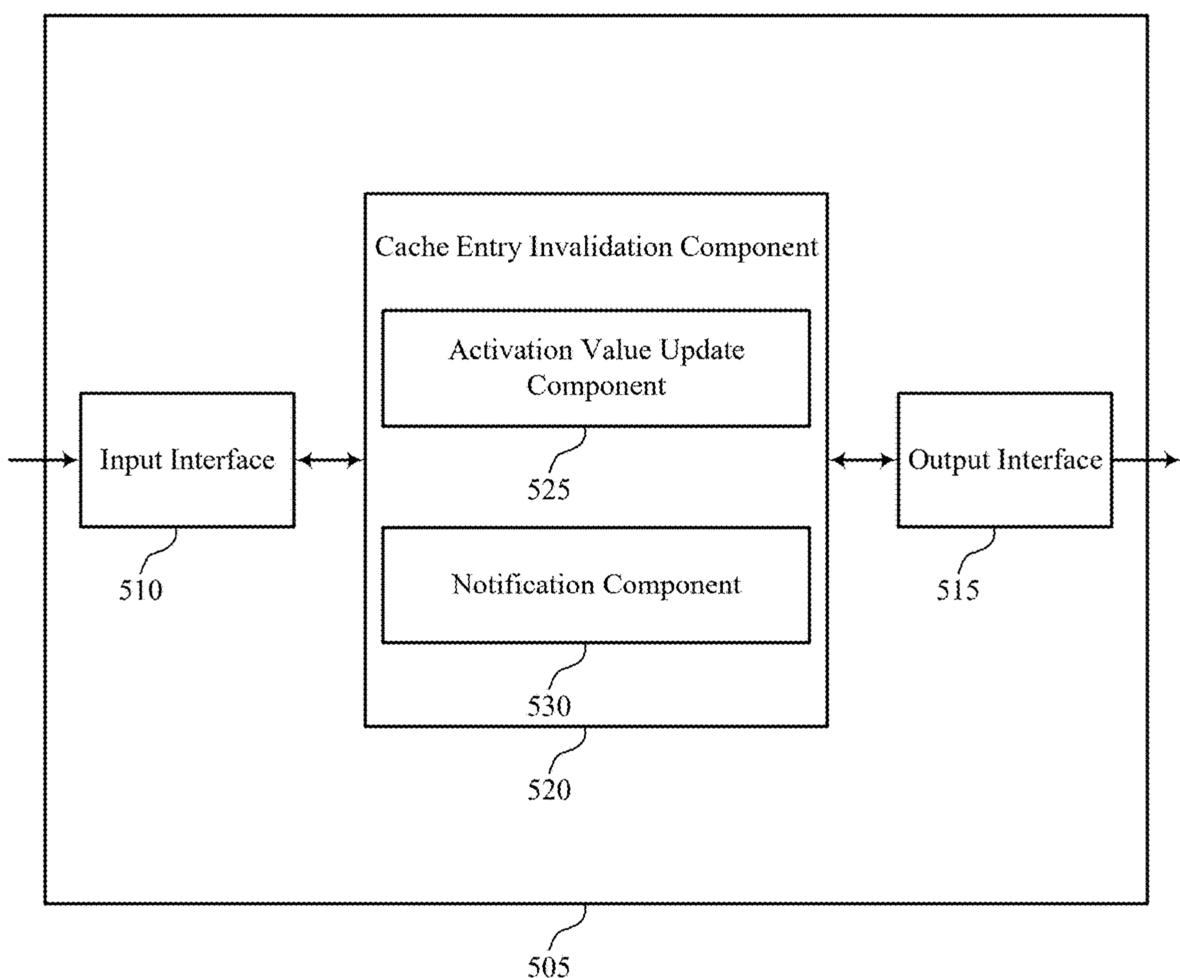
FIG. 5 shows a block diagram of an apparatus that supports notification based expiry of cache entries in accordance with aspects of the present disclosure.

FIG. 5 shows a block diagram 500 of a system 505 that supports notification based expiry of cache entries in accordance with aspects of the present disclosure. In some examples, the system 505 may be an example of aspects of one or more components described with reference to FIG. 1, such as a DMS 110. The system 505 may include an input interface 510, an output interface 515, and a cache entry invalidation component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the cache entry invalidation component 520 to support notification based expiry of cache entries. In some cases, the input interface 510 may be a component of a network interface 725 as described with reference to FIG. 7.

The output interface 515 may manage output signaling for the system 505. For example, the output interface 515 may receive signaling from other components of the system 505, such as the cache entry invalidation component 520, and may transmit such output signaling corresponding to (e.g., representative of or otherwise based on) such signaling to other systems or devices. In some cases, the output interface 515 may be a component of a network interface 725 as described with reference to FIG. 7.

For example, the cache entry invalidation component 520 may include an activation value update component 525 a notification component 530, or any combination thereof. In some examples, the cache entry invalidation component 520, or various components thereof, may be configured to perform various operations (e.g., receiving, monitoring, transmitting) using or otherwise in cooperation with the input interface 510, the output interface 515, or both. For example, the cache entry invalidation component 520 may receive information from the input interface 510, send information to the output interface 515, or be integrated in combination with the input interface 510, the output interface 515, or both to receive information, transmit information, or perform various other operations as described herein.

The activation value update component 525 may be configured as or otherwise support a means for obtaining, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer. The notification component 530 may be configured as or otherwise support a means for outputting, by the DMS and to a message queue accessible to the set of multiple storage nodes and based on the indication that the activation value for the feature for the first customer has changed, a notification for one or more storage nodes to invalidate a cache entry associated with the feature for the first customer.

Figure 6:
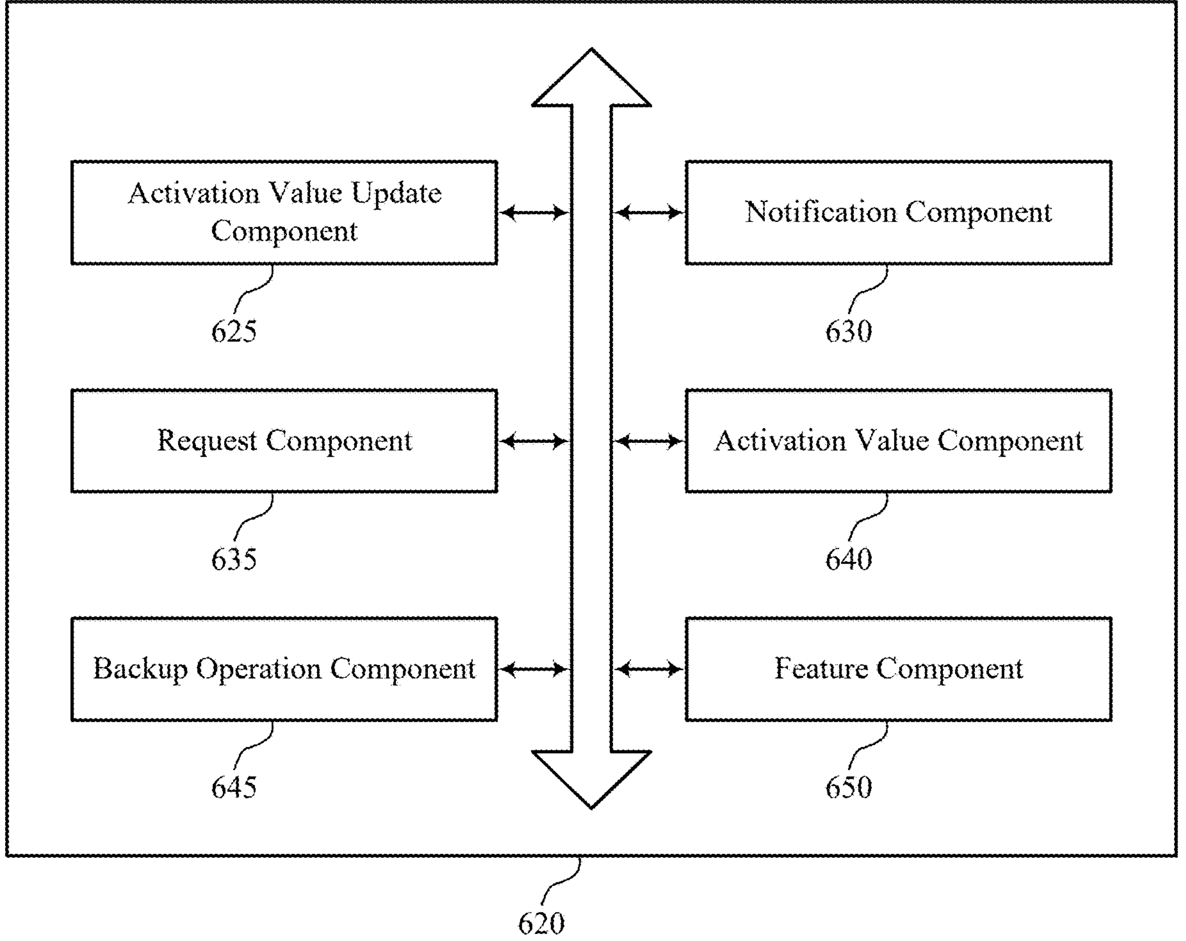
FIG. 6 shows a block diagram of a cache entry invalidation component that supports notification based expiry of cache entries in accordance with aspects of the present disclosure.

FIG. 6 shows a block diagram 600 of a cache entry invalidation component 620 that supports notification based expiry of cache entries in accordance with aspects of the present disclosure. The cache entry invalidation component 620 may be an example of aspects of a cache entry invalidation component or a cache entry invalidation component 520, or both, as described herein. The cache entry invalidation component 620, or various components thereof, may be an example of means for performing various aspects of notification based expiry of cache entries as described herein. For example, the cache entry invalidation component 620 may include an activation value update component 625, a notification component 630, a request component 635, an activation value component 640, a backup operation component 645, a feature component 650, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The activation value update component 625 may be configured as or otherwise support a means for obtaining, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer. The notification component 630 may be configured as or otherwise support a means for outputting, by the DMS and to a message queue accessible to the set of multiple storage nodes and based on the indication that the activation value for the feature for the first customer has changed, a notification for one or more storage nodes to invalidate a cache entry associated with the feature for the first customer.

In some examples, the request component 635 may be configured as or otherwise support a means for obtaining, by the DMS from a first storage node of the set of multiple storage nodes at a first time, a request for the activation value of the feature for the first customer based on outputting the notification. In some examples, the activation value component 640 may be configured as or otherwise support a means for outputting, by the DMS, an indication of the activation value of the feature for the first customer.

In some examples, the backup operation component 645 may be configured as or otherwise support a means for outputting, by the DMS, a message that schedules the first storage node to perform a backup operation for the first customer or a restore operation for the first customer, where obtaining the request is based on the message.

In some examples, the request component 635 may be configured as or otherwise support a means for obtaining, by the DMS from a second storage node of the set of multiple storage nodes at a second time, a second request for the activation value of the feature for the first customer based on outputting the notification, where the second time is after the first time. In some examples, the activation value component 640 may be configured as or otherwise support a means for outputting, by the DMS, a second indication of the activation value of the feature for the first customer.

In some examples, to support outputting the notification, the notification component 630 may be configured as or otherwise support a means for outputting the notification to a topic of the message queue, where the topic is associated with the feature for the first customer, and where the message queue includes a set of multiple topics associated with a set of multiple respective features, the set of multiple topics including the topic.

In some examples, to support outputting the notification, the notification component 630 may be configured as or otherwise support a means for outputting the notification to a subset of storage nodes of the set of multiple storage nodes based on the subset of storage nodes being subscribed to the topic of the message queue.

In some examples, the activation value update component 625 may be configured as or otherwise support a means for obtaining, at the DMS, a second indication that a second activation value of a second feature for a second customer of the one or more customers has changed, the second feature associated with the management of the backup data, the second activation value indicating if the second feature is enabled for the second customer. In some examples, the notification component 630 may be configured as or otherwise support a means for outputting, to a second topic of the message queue and based on the indication that the activation value for the feature for the second customer has changed, a second notification for one or more second nodes to invalidate a second cache entry associated with the second feature for the second customer, where the second topic is associated with the second feature for the second customer.

In some examples, the activation value update component 625 may be configured as or otherwise support a means for obtaining, at the DMS, a second indication that a second activation value of a second feature for the first customer of the one or more customers has changed, the second feature associated with the management of the backup data, the second activation value indicating if the second feature is enabled for the first customer. In some examples, the notification component 630 may be configured as or otherwise support a means for outputting, to a second topic of the message queue and based on the indication that the activation value for the feature for the first customer has changed, a second notification for one or more second nodes to invalidate a second cache entry associated with the second feature for the first customer, where the second topic is associated with the second feature for the first customer.

In some examples, the activation value update component 625 may be configured as or otherwise support a means for updating the activation value of the feature, where obtaining the indication that the activation value has changed is based on updating the activation value.

In some examples, the feature component 650 may be configured as or otherwise support a means for enabling or disabling the feature for the first customer based on the activation value, where the management of the backup data is based on enabling or disabling of the feature for the first customer.

In some examples, to support obtaining the indication that the activation value has changed, the activation value update component 625 may be configured as or otherwise support a means for receiving, via a user interface associated with an administrative user, the indication that the activation value has changed.

In some examples, the cache entry associated with the feature for the first customer includes a feature ID associated with the feature, a customer ID associated with the first customer, and the activation value.

In some examples, the request component 635 may be configured as or otherwise support a means for obtaining, by the DMS from a first storage node of the set of multiple storage nodes and prior to obtaining the indication that the activation value of the feature has changed, a request for the activation value of the feature for the first customer, where the activation value is associated with a TTL duration, and where the notification is output prior to an expiration of the TTL duration.

In some examples, the notification is configured to cause the one or more storage nodes of the set of multiple storage nodes to remove the cache entry from respective caches of the one or more storage nodes.

In some examples, invalidate the cache entry associated with the feature for the first customer based on the notification.

Figure 7:
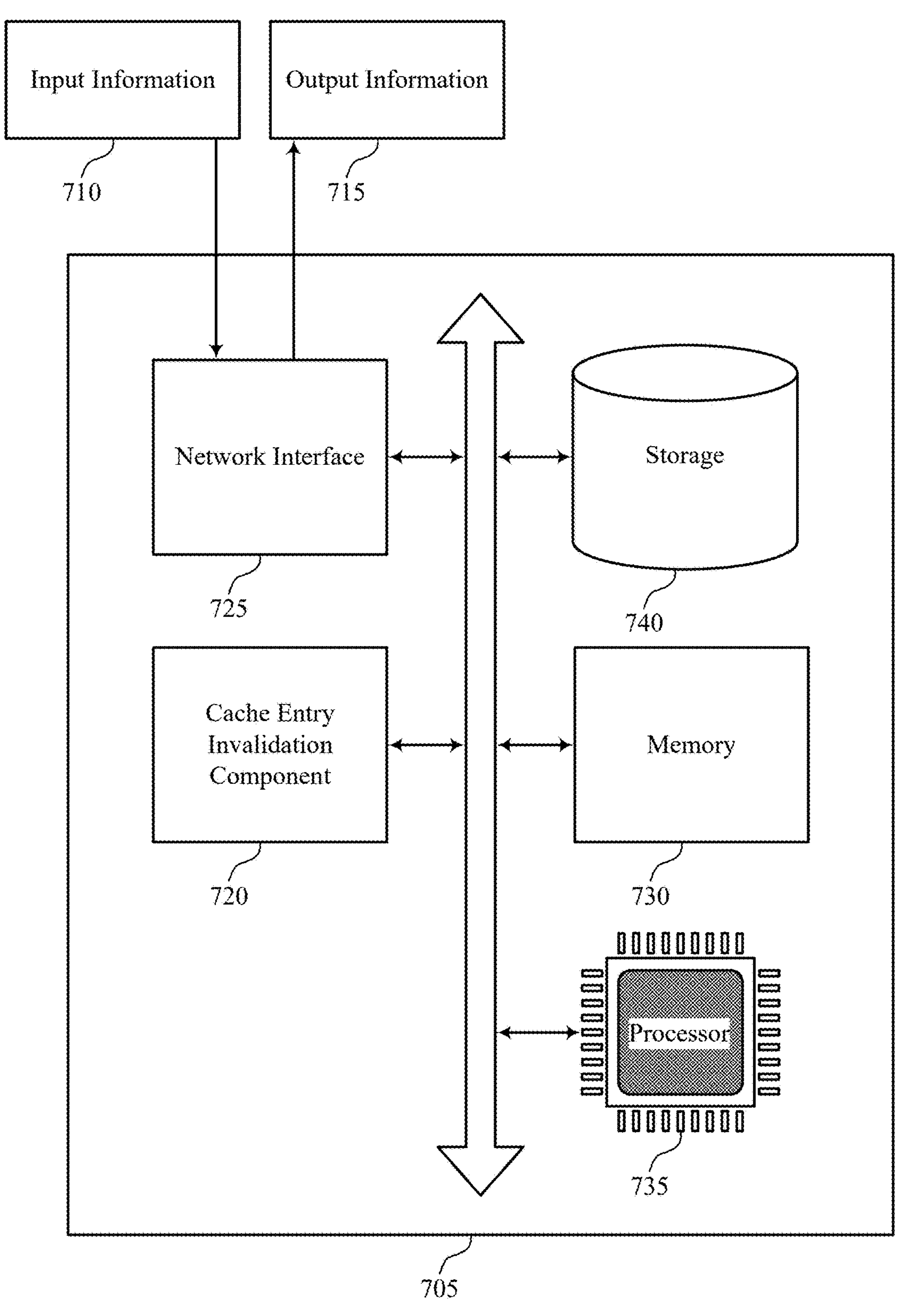
FIG. 7 shows a diagram of a system including a device that supports notification based expiry of cache entries in accordance with aspects of the present disclosure.

FIG. 7 shows a block diagram 700 of a system 705 that supports notification based expiry of cache entries in accordance with aspects of the present disclosure. The system 705 may be an example of or include components of a system 505 as described herein. The system 705 may include components for data management, including components such as a cache entry invalidation component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting notification based expiry of cache entries). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the cache entry invalidation component 720 may be configured as or otherwise support a means for obtaining, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer. The cache entry invalidation component 720 may be configured as or otherwise support a means for outputting, by the DMS and to a message queue accessible to the set of multiple storage nodes and based on the indication that the activation value for the feature for the first customer has changed, a notification for one or more storage nodes to invalidate a cache entry associated with the feature for the first customer.

By including or configuring the cache entry invalidation component 720 in accordance with examples as described herein, the system 705 may support techniques for notification based expiry of cache entries, which may provide one or more benefits such as, for example, reduced latency, reduced power consumption, more efficient utilization of computing resources, network resources or both, or improved scalability, among other possibilities.

FIG. 8 shows a flowchart illustrating a method 800 that supports notification based expiry of cache entries in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include obtaining, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer. The operations of 805 may be performed in accordance with examples as disclosed herein. In some examples, aspects of the operations of 805 may be performed by an activation value update component 625 as described with reference to FIG. 6.

At 810, the method may include outputting, by the DMS and to a message queue accessible to the set of multiple storage nodes and based on the indication that the activation value for the feature for the first customer has changed, a notification for one or more storage nodes to invalidate a cache entry associated with the feature for the first customer. The operations of 810 may be performed in accordance with examples as disclosed herein. In some examples, aspects of the operations of 810 may be performed by a notification component 630 as described with reference to FIG. 6.

FIG. 9 shows a flowchart illustrating a method 900 that supports notification based expiry of cache entries in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include obtaining, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer. The operations of 905 may be performed in accordance with examples as disclosed herein. In some examples, aspects of the operations of 905 may be performed by an activation value update component 625 as described with reference to FIG. 6.

At 910, the method may include outputting, by the DMS and to a message queue accessible to the set of multiple storage nodes and based on the indication that the activation value for the feature for the first customer has changed, a notification for one or more storage nodes to invalidate a cache entry associated with the feature for the first customer. The operations of 910 may be performed in accordance with examples as disclosed herein. In some examples, aspects of the operations of 910 may be performed by a notification component 630 as described with reference to FIG. 6.

At 915, the method may include obtaining, by the DMS from a first storage node of the set of multiple storage nodes at a first time, a request for the activation value of the feature for the first customer based on outputting the notification. The operations of 915 may be performed in accordance with examples as disclosed herein. In some examples, aspects of the operations of 915 may be performed by a request component 635 as described with reference to FIG. 6.

At 920, the method may include outputting, by the DMS, an indication of the activation value of the feature for the first customer. The operations of 920 may be performed in accordance with examples as disclosed herein. In some examples, aspects of the operations of 920 may be performed by an activation value component 640 as described with reference to FIG. 6.

Figure 10:
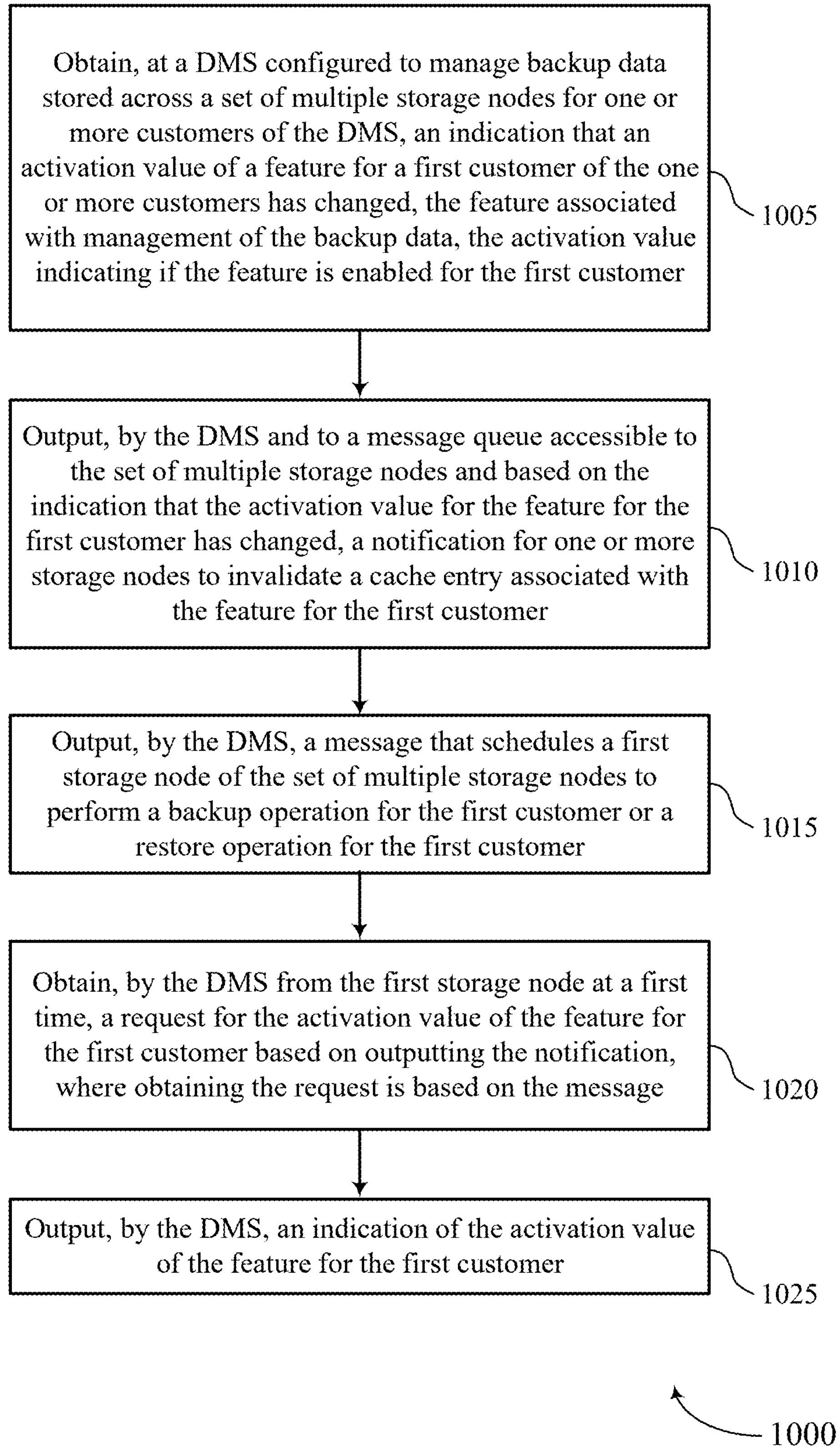

FIG. 10 shows a flowchart illustrating a method 1000 that supports notification based expiry of cache entries in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, at a DMS configured to manage backup data stored across a set of multiple storage nodes for one or more customers of the DMS, an indication that an activation value of a feature for a first customer of the one or more customers has changed, the feature associated with management of the backup data, the activation value indicating if the feature is enabled for the first customer. The operations of 1005 may be performed in accordance with examples as disclosed herein. In some examples, aspects of the operations of 1005 may be performed by an activation value update component 625 as described with reference to FIG. 6.

At 1010, the method may include outputting, by the DMS and to a message queue accessible to the set of multiple storage nodes and based on the indication that the activation value for the feature for the first customer has changed, a notification for one or more storage nodes to invalidate a cache entry associated with the feature for the first customer. The operations of 1010 may be performed in accordance with examples as disclosed herein. In some examples, aspects of the operations of 1010 may be performed by a notification component 630 as described with reference to FIG. 6.

At 1015, the method may include outputting, by the DMS, a message that schedules a first storage node of the set of multiple storage nodes to perform a backup operation for the first customer or a restore operation for the first customer. The operations of 1015 may be performed in accordance with examples as disclosed herein. In some examples, aspects of the operations of 1015 may be performed by a backup operation component 645 as described with reference to FIG. 6.

At 1020, the method may include obtaining, by the DMS from the first storage node at a first time, a request for the activation value of the feature for the first customer based on outputting the notification, where obtaining the request is based on the message. The operations of 1020 may be performed in accordance with examples as disclosed herein. In some examples, aspects of the operations of 1020 may be performed by a request component 635 as described with reference to FIG. 6.

At 1025, the method may include outputting, by the DMS, an indication of the activation value of the feature for the first customer. The operations of 1025 may be performed in accordance with examples as disclosed herein. In some examples, aspects of the operations of 1025 may be performed by an activation value component 640 as described with reference to FIG. 6.

The following provides an overview of aspects of the present disclosure:

Aspect 1: A method, comprising: obtaining, at a DMS configured to manage backup data stored across a plurality of storage nodes for one or more customers of the DMS, an indication that an activation value of a feature for a first customer of the one or more customers has changed, the feature associated with management of the backup data, the activation value indicating if the feature is enabled for the first customer; and outputting, by the DMS and to a message queue accessible to the plurality of storage nodes and based at least in part on the indication that the activation value for the feature for the first customer has changed, a notification for one or more storage nodes to invalidate a cache entry associated with the feature for the first customer.

Aspect 2: The method of aspect 1, further comprising: obtaining, by the DMS from a first storage node of the plurality of storage nodes at a first time, a request for the activation value of the feature for the first customer based at least in part on outputting the notification; and outputting, by the DMS, an indication of the activation value of the feature for the first customer.

Aspect 3: The method of aspect 2, further comprising: outputting, by the DMS, a message that schedules the first storage node to perform a backup operation for the first customer or a restore operation for the first customer, wherein obtaining the request is based at least in part on the message.

Aspect 4: The method of any of aspects 2 through 3, further comprising: obtaining, by the DMS from a second storage node of the plurality of storage nodes at a second time, a second request for the activation value of the feature for the first customer based at least in part on outputting the notification, wherein the second time is after the first time; and outputting, by the DMS, a second indication of the activation value of the feature for the first customer.

Aspect 5: The method of any of aspects 1 through 4, wherein outputting the notification further comprises: outputting the notification to a topic of the message queue, wherein the topic is associated with the feature for the first customer, and wherein the message queue comprises a plurality of topics associated with a plurality of respective features, the plurality of topics comprising the topic.

Aspect 6: The method of aspect 5, wherein outputting the notification further comprises: outputting the notification to a subset of storage nodes of the plurality of storage nodes based at least in part on the subset of storage nodes being subscribed to the topic of the message queue.

Aspect 7: The method of any of aspects 5 through 6, further comprising: obtaining, at the DMS, a second indication that a second activation value of a second feature for a second customer of the one or more customers has changed, the second feature associated with the management of the backup data, the second activation value indicating if the second feature is enabled for the second customer; and outputting, to a second topic of the message queue and based at least in part on the indication that the activation value for the feature for the second customer has changed, a second notification for one or more second nodes to invalidate a second cache entry associated with the second feature for the second customer, wherein the second topic is associated with the second feature for the second customer.

Aspect 8: The method of any of aspects 5 through 7, further comprising: obtaining, at the DMS, a second indication that a second activation value of a second feature for the first customer of the one or more customers has changed, the second feature associated with the management of the backup data, the second activation value indicating if the second feature is enabled for the first customer; and outputting, to a second topic of the message queue and based at least in part on the indication that the activation value for the feature for the first customer has changed, a second notification for one or more second nodes to invalidate a second cache entry associated with the second feature for the first customer, wherein the second topic is associated with the second feature for the first customer.

Aspect 9: The method of any of aspects 1 through 8, further comprising: updating the activation value of the feature, wherein obtaining the indication that the activation value has changed is based at least in part on updating the activation value.

Aspect 10: The method of aspect 9, further comprising: enabling or disabling the feature for the first customer based at least in part on the activation value, wherein the management of the backup data is based at least in part on enabling or disabling of the feature for the first customer.

Aspect 11: The method of any of aspects 1 through 10, wherein obtaining the indication that the activation value has changed comprises: receiving, via a user interface associated with an administrative user, the indication that the activation value has changed.

Aspect 12: The method of any of aspects 1 through 11, wherein the cache entry associated with the feature for the first customer comprises a feature ID associated with the feature, a customer ID associated with the first customer, and the activation value.

Aspect 13: The method of any of aspects 1 through 12, further comprising: obtaining, by the DMS from a first storage node of the plurality of storage nodes and prior to obtaining the indication that the activation value of the feature has changed, a request for the activation value of the feature for the first customer, wherein the activation value is associated with a TTL duration, and wherein the notification is output prior to an expiration of the TTL duration.

Aspect 14: The method of any of aspects 1 through 13, wherein the notification is configured to cause the one or more storage nodes of the plurality of storage nodes to remove the cache entry from respective caches of the one or more storage nodes.

Aspect 15: The method of any of aspects 1 through 14, wherein the notification is configured to cause the one or more storage nodes of the plurality of storage nodes to invalidate the cache entry associated with the feature for the first customer based at least in part on the notification.

Aspect 16: An apparatus comprising one or more memories storing processor-executable code, and one or more processors coupled with the one or more memories and individually or collectively operable to execute the code to cause the apparatus to perform a method of any of aspects 1 through 15.

Aspect 17: An apparatus comprising at least one means for performing a method of any of aspects 1 through 15.

Aspect 18: A non-transitory computer-readable medium storing code the code comprising instructions executable by one or more processors to perform a method of any of aspects 1 through 15.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining, at a data management system (DMS) configured to manage backup data stored across a plurality of storage nodes for one or more customers of the DMS, an indication that an activation value of a feature for a first customer of the one or more customers has changed, the feature associated with management of the backup data, the activation value indicating if the feature is enabled for the first customer; and outputting, by the DMS and to a message queue accessible to the plurality of storage nodes and based at least in part on the indication that the activation value for the feature for the first customer has changed, a notification for one or more storage nodes to invalidate a cache entry associated with the feature for the first customer.

2. The method of claim 1, further comprising:

obtaining, by the DMS from a first storage node of the plurality of storage nodes at a first time, a request for the activation value of the feature for the first customer based at least in part on outputting the notification; and outputting, by the DMS, an indication of the activation value of the feature for the first customer.

3. The method of claim 2, further comprising:

outputting, by the DMS, a message that schedules the first storage node to perform a backup operation for the first customer or a restore operation for the first customer, wherein obtaining the request is based at least in part on the message.

4. The method of claim 2, further comprising:

obtaining, by the DMS from a second storage node of the plurality of storage nodes at a second time, a second request for the activation value of the feature for the first customer based at least in part on outputting the notification, wherein the second time is after the first time; and outputting, by the DMS, a second indication of the activation value of the feature for the first customer.

5. The method of claim 1, wherein outputting the notification further comprises:

outputting the notification to a topic of the message queue, wherein the topic is associated with the feature for the first customer, and wherein the message queue comprises a plurality of topics associated with a plurality of respective features, the plurality of topics comprising the topic.

6. The method of claim 5, wherein outputting the notification further comprises:

outputting the notification to a subset of storage nodes of the plurality of storage nodes based at least in part on the subset of storage nodes being subscribed to the topic of the message queue.

7. The method of claim 5, further comprising:

obtaining, at the DMS, a second indication that a second activation value of a second feature for a second customer of the one or more customers has changed, the second feature associated with the management of the backup data, the second activation value indicating if the second feature is enabled for the second customer; and outputting, to a second topic of the message queue and based at least in part on the indication that the activation value for the feature for the second customer has changed, a second notification for one or more second nodes to invalidate a second cache entry associated with the second feature for the second customer, wherein the second topic is associated with the second feature for the second customer.

8. The method of claim 5, further comprising:

obtaining, at the DMS, a second indication that a second activation value of a second feature for the first customer of the one or more customers has changed, the second feature associated with the management of the backup data, the second activation value indicating if the second feature is enabled for the first customer; and outputting, to a second topic of the message queue and based at least in part on the indication that the activation value for the feature for the first customer has changed, a second notification for one or more second nodes to invalidate a second cache entry associated with the second feature for the first customer, wherein the second topic is associated with the second feature for the first customer.

9. The method of claim 1, further comprising:

updating the activation value of the feature, wherein obtaining the indication that the activation value has changed is based at least in part on updating the activation value.

10. The method of claim 9, further comprising:

enabling or disabling the feature for the first customer based at least in part on the activation value, wherein the management of the backup data is based at least in part on enabling or disabling of the feature for the first customer.

11. The method of claim 1, wherein obtaining the indication that the activation value has changed comprises:

receiving, via a user interface associated with an administrative user, the indication that the activation value has changed.

12. The method of claim 1, wherein the cache entry associated with the feature for the first customer comprises a feature identifier associated with the feature, a customer identifier associated with the first customer, and the activation value.

13. The method of claim 1, further comprising:

obtaining, by the DMS from a first storage node of the plurality of storage nodes and prior to obtaining the indication that the activation value of the feature has changed, a request for the activation value of the feature for the first customer, wherein the activation value is associated with a time to live duration, and wherein the notification is output prior to an expiration of the time to live duration.

14. The method of claim 1, wherein the notification is configured to cause the one or more storage nodes of the plurality of storage nodes to remove the cache entry from respective caches of the one or more storage nodes.

15. The method of claim 1, wherein the notification is configured to cause the one or more storage nodes of the plurality of storage nodes to invalidate the cache entry associated with the feature for the first customer based at least in part on the notification.

16. An apparatus, comprising:

one or more memories storing processor-executable code; and one or more processors coupled with the one or more memories and individually or collectively operable to execute the code to cause the apparatus to:

obtain, at a data management system (DMS) configured to manage backup data stored across a plurality of storage nodes for one or more customers of the DMS, an indication that an activation value of a feature for a first customer of the one or more customers has changed, the feature associated with management of the backup data, the activation value indicating if the feature is enabled for the first customer; and output, by the DMS and to a message queue accessible to the plurality of storage nodes and based at least in part on the indication that the activation value for the feature for the first customer has changed, a notification for one or more storage nodes to invalidate a cache entry associated with the feature for the first customer.

17. The apparatus of claim 16, wherein the one or more processors are individually or collectively further operable to execute the code to cause the apparatus to:

obtain, by the DMS from a first storage node of the plurality of storage nodes at a first time, a request for the activation value of the feature for the first customer based at least in part on outputting the notification; and output, by the DMS, an indication of the activation value of the feature for the first customer.

18. The apparatus of claim 17, wherein the one or more processors are individually or collectively further operable to execute the code to cause the apparatus to:

output, by the DMS, a message that schedules the first storage node to perform a backup operation for the first customer or a restore operation for the first customer, wherein obtaining the request is based at least in part on the message.

19. The apparatus of claim 17, wherein the one or more processors are individually or collectively further operable to execute the code to cause the apparatus to:

obtain, by the DMS from a second storage node of the plurality of storage nodes at a second time, a second request for the activation value of the feature for the first customer based at least in part on outputting the notification, wherein the second time is after the first time; and output, by the DMS, a second indication of the activation value of the feature for the first customer.

20. A non-transitory computer-readable medium storing code, the code comprising instructions executable by one or more processors to:

obtain, at a data management system (DMS) configured to manage backup data stored across a plurality of storage nodes for one or more customers of the DMS, an indication that an activation value of a feature for a first customer of the one or more customers has changed, the feature associated with management of the backup data, the activation value indicating if the feature is enabled for the first customer; and output, by the DMS and to a message queue accessible to the plurality of storage nodes and based at least in part on the indication that the activation value for the feature for the first customer has changed, a notification for one or more storage nodes to invalidate a cache entry associated with the feature for the first customer.

* * * * *